(12) United States Patent
Stevens et al.

(10) Patent No.: US 7,485,689 B2
(45) Date of Patent: Feb. 3, 2009

(54) TENSIO-ACTIVE GLUCOSIDE URETHANES

(75) Inventors: Christian Victor Stevens, Merelbeke-Schelderode (BE); Alessia Meriggi, Stradella (IT); Karl Booten, Geetbets (BE)

(73) Assignee: Tiense Suikerraffinaderij N.V. (BE)

( * ) Notice: Subject to any disclaimer, the term of this patent is extended or adjusted under 35 U.S.C. 154(b) by 611 days.

(21) Appl. No.: 10/169,618

(22) PCT Filed: Dec. 12, 2000

(86) PCT No.: PCT/EP00/12281

§ 371 (c)(1),
(2), (4) Date: Aug. 27, 2002

(87) PCT Pub. No.: WO01/44303

PCT Pub. Date: Jun. 21, 2001

(65) Prior Publication Data

US 2003/0125482 A1 Jul. 3, 2003

(30) Foreign Application Priority Data

Dec. 14, 1999 (EP) .................................. 99124912

(51) Int. Cl.
*C08B 31/04* (2006.01)
*C08G 18/71* (2006.01)

(52) U.S. Cl. ...................... 527/300; 527/301; 536/1.11; 536/16.3; 536/18.7; 536/30; 536/32; 536/35; 536/56; 536/58; 536/123.1; 536/123.12; 536/124

(58) Field of Classification Search ................ 527/300, 527/301; 536/123.1, 123.12, 124; 530/1.11, 530/16.3, 18.7, 30, 32, 35, 56, 58, 132.1, 530/123.12, 124

See application file for complete search history.

(56) References Cited

U.S. PATENT DOCUMENTS

| 3,803,062 | A | 4/1974 | Rodia et al. ............... 260/468 E |
| 3,890,383 | A | 6/1975 | Rodia et al. ............ 260/556 AR |
| 2001/0007027 | A1 | 7/2001 | Engelhardt et al. ............. 536/36 |

FOREIGN PATENT DOCUMENTS

| DE | 1 518 696 | | 1/1965 |
| DE | 43 38 152 A1 | | 5/1995 |
| EP | 0 157 365 | | 10/1985 |
| EP | 0 801 077 A2 | | 10/1997 |
| EP | 0 964 054 A1 | | 12/1999 |
| JP | 05-42775 | * | 2/1993 |
| JP | 05-43649 | * | 2/1993 |
| WO | WO 99 64549 A | | 12/1999 |

OTHER PUBLICATIONS

Technical brochure "Glucidex" Brochure Aug. 9, 1998 from Roquette Company pp. 4, 6 and 7.
*On the Reaction of Potato Starch with Isocyanates*; By: Ernst W.H. Asveld, Eize J. Stamhuis & Geert E.H. Joosten; Carbohydrate Polymers 4 (1984) pp. 103-110.
*Uber Umsetzungen von Saccharose mit 1-(n-Alkoxy)-athylisocyanaten*; By: Von T. Lesiak and J. Iwaszkiewicz-Nowak; Journal f. prakt. Chemie. Band 319, Heft 5, 1977, pp. 727-731.
*Synthesis and Surface-Active Properties of Amphiphilic 6-Aminocarbonyl Derivatives of D-Glucose*; By: Valerie Maunier, Paul Boullanger, Dominique Lafont and Yves Chevalier; Carbohydrate Research 299 (1997) pp. 49-57.
*Uber neue Synthesen oberflachenaktiver Saccharosederivate*; By: W. Gerhardt; Abh. Dtsch. Akad. Wiss. Berlin, KL. Chem. Geol. Biol., vol. 1966 (6), pp. 24-32, (1967) (C.A., 68, 14323).
*Uber Umsetzungen von Saccharose mit n-Alkylisocyanaten*; By: Von H. Bertsch, E. Ulsperger, W. Gerhardt and M. Bock; J. prakt. Chem., 11, 108 (1960) pp. 108-114.
C. Schmidt, R.R. Schmidt et al., "Neue Tenside auf Kohlenhydratbasis" Tenside, Surfactants, Detergents. vol. 36, No. 4, 1999, pp. 244-249, XP000887230.
*a,B-ungesattigte Isocyanate durch Thermolyse von N-(1-Alkenyl)-N-alkylcarbamoylchloriden*; K. Konig et al., Angew Chem., 91 (4), pp. 334-335, (1979).
*Polysaccharide Aryl Carbmates. IV. Partly Substituted and Crosslinked Starch*; I. Wolff et al., J. prakt. Chem., 319 (5), pp. 727-731, (1977).
*Starch Hydrolysis Products*, Worldwide Technology, Production and Applications, Weinheim VCH Publishers, Inc. (1992), Ch 6 pp. 177-199; Ch 7 pp. 201-231; Ch 8 pp. 233-274 and Ch 9 pp. 277-316.

* cited by examiner

Primary Examiner—Irina S Zemel
(74) Attorney, Agent, or Firm—Hayes Soloway P.C.

(57) ABSTRACT

Disclosed are glucoside alkyl urethanes composed of units of the formula: $A(O-CO-NH-R)_s$ wherein A represents a glucosyl unit of a starch hydrolysate molecule, the starch hydrolysate having a Dextrose Equivalent (D.E.) ranging from 1 to 47, (O—CO—NH—R) represents an N-alkyl aminocarbonyloxy group replacing a hydroxyl group of the glucosyl unit A, and wherein R represents a linear or branched, saturated or unsaturated alkyl group containing from 3 to 22 carbon atoms, and s represents the number of alkyl carbamate groups per glucosyl unit which number is expressed as degree of substitution (DS) with said DS value ranging from about 0.01 to about 2.0 which are useful as surface-active agents. Also disclosed are a method for their manufacture and compositions containing one or more glucoside alkyl urethanes. The glucoside alkyl urethanes have good to excellent tensio-active properties in combination with good biodegrability and they are suitable as surfactants for use in household and industrial applications, e.g., as detergents, emulsifiers, emulsion stabilisers, foaming agents, foam stabilisers, dispersants and wetting agents.

28 Claims, No Drawings

TENSIO-ACTIVE GLUCOSIDE URETHANES

FIELD OF THE INVENTION

This invention relates to glucoside urethanes, in particular to the use as surfactant of alkyl urethanes of glucosides, to novel tensio-active glycoside alkyl urethanes, to a process for their manufacture and to compositions comprising said urethanes.

BACKGROUND AND PRIOR ART

Tensio-active agents are widely used as surfactants in compositions for household and industrial applications in which they may act as detergents, foaming agents, foam stabilisers, wetting agents, emulsifiers and/or emulsion stabilisers.

The oldest type of tensio-active agents are the alkali soaps of fatty acids. They were mainly used as detergents and are still widely used today in spite of their relatively weak tensio-active properties. Much stronger synthetic surfactants have been developed since. The elder generation of widely used synthetic surfactants was mainly formed of alkyl benzene sulfonates (ABS). However, ABS, in particular branched alkyl benzene sulfonates, presented the disadvantage of causing serious water pollution problems due to their poor biodegradability. Accordingly, ABS have been largely replaced by linear alkyl sufonates (LAS) with ten or more carbon atoms in the alkyl chain and which present improved biodegradability compared to ABS surfactants.

In the search for alternative or improved surfactants, monomeric and dimeric sugars such as glucose and sucrose (saccharose) have been used as starting material for the synthesis of non-ionic derivatives with tensio-active properties.

V. Maunier et al. (Carbohydrate Research, 299, 49-57, (1997)) disclosed tensio-active properties of several 6-aminocarbonyl derivatives of methyl α-D-glucopyranoside and D-glucose and compared them with the properties of the urethane methyl 6-O-(N-heptylcarbamoyl)-α-D-gluco-pyranoside.

The synthesis of several sucrose N-n-alkyl urethanes and their tensio-active properties have been disclosed i.a. by H. Bertsch et al. (J. prakt. Chem., 11, 108 (1960)) and by W. Gerhardt (Abh. Dtsch. Akad. Wiss. Berlin, Kl. Chem., Geol. Biol., Vol 1966 (6), 24-32, (1967)). The urethanes are prepared by reacting sucrose with the corresponding n-alkyl isocyanate (H. Bertsch et al. o.c.) and by reacting sucrose with potassium cyanate in the presence of a selected n-alkyl halogenide in dimethyl formamide (W. Gerhardt, o.c.). The derivatives present moderate to good tensio-active properties but only at rather high concentration and the sucrose n-alkyl urethane derivatives with long alkyl chains suffer from poor solubility in water.

To overcome the poor solubility in water of the monomeric and dimeric sugar n-alkyl urethanes, several approaches were examined, including the synthesis of n-alkyl urethanes of ethoxylated or propoxylated monomeric and dimeric sugars and the synthesis of alkoxylated alkyl urethanes of monomeric and dimeric sugars. The synthesis and tensio-active properties of n-alkyl urethanes derived from ethoxylated and propoxylated sucrose, respectively mannitol, have been disclosed by W. Gerhardt (o.c. and German Patent DE 1 518 696). The synthesis and tensio-active properties of 1-(n-alkyloxy)-ethylurethanes of sucrose have been disclosed by T. Lesiak et al. (J. prakt. Chem., 319 (5), 727-731, (1977)).

Moreover, the preparation of miscellaneous urethanes derived from various carbohydrates have been disclosed. I. Wolff et al. (J. Am. Chem. Soc., 76, 757 (1954)) mentioned to have prepared urethanes of starch, but later studies by E. Asveld et al. (Carbohydrate Polymers, 4, 103-110, (1984)) revealed that in the aqueous reaction conditions used by I. Wolff et al. no urethanes but only mixtures of the carbohydrate and urea compounds were formed.

European patent application EP 0 801 077 discloses n-($C_1$-$C_{18}$) alkyl urethanes of cellulose and alkoxylated cellulose. Similarly, German patent application DE 43 38 152 A1 discloses n-alkyl urethanes of starch and partially acetylated starch. Both patent applications disclose the use of the alkyl urethanes as thermoplastic material but are completely silent about possible tensio-active properties of said urethanes.

European patent application EP 0 157 365 discloses various urethane derivatives of polysaccharides including alkyl carbamates of cellulose, amylose, chitosan, dextran, xylan and inulin, and discloses their use for the optical resolution of racemic mixtures. No mention is made of possible tensio-active properties of the carbamates.

In co-pending European patent application EP 98870135.5 (applicant: Tiense Suikerraffinaderij n.v.), tensio-active alkyl urethanes of fructans, particularly of inulin, are described.

In view of the steadily increasing demand for surfactants and the increasing severity of national and supra-national Regulations with respect to toxicity and biodegradability of surfactants for household and industrial use, the search for alternative and for more efficient and/or better biodegradable surfactants is continually going on.

OBJECT OF THE INVENTION

It is the object of the present invention to provide a solution to one or more of the above mentioned problems by the provision of alternative tensio-active products which are suitable as surfactants.

DESCRIPTION OF THE INVENTION

In their search for alternative and improved surfactants, the inventors have found that certain alkyl urethanes of glucosides provide a solution to one or more of said problems.

In accordance with these findings, the present invention provides the use as tensio-active agents of alkyl urethanes of glucosides, particularly of alkyl urethanes of starch hydrolysates, provides novel alkyl urethanes of glucosides with tensio-active properties, a method for the manufacture of said urethanes, and compositions comprising one or more of said urethanes as surfactants.

By tensio-active agent, surface-active agent and surfactant are meant herein compounds that reduce the surface tension when dissolved in water or in an aqueous medium, or which reduce interfacial tension between two liquids, between a liquid and a solid or between a liquid and a gas. These terms are used herein interchangeably. The same applies to the terms which designate said properties.

By the term alkyl urethane(s), herein in short urethane(s), are designated a class of compounds bearing an alkyl-NH—CO—O— group (formed for example by the reaction of an alkyl isocyanate with an alcoholic hydroxyl group bearing substrate), whereas the individual compounds are commonly named N-alkyl carbamates, i.e. as esters of N-alkyl carbamic acid. However, the terms urethane(s) and carbamate(s) are often, also in this description, interchanged.

DETAILED DESCRIPTION OF THE INVENTION

Starch is a well-known carbohydrate that is abundantly present in many plants as a biodegradable reserve polysaccharide. Starch molecules are polymers composed of D-glucosyl units which are linked to one another by α-1,4 glucosyl-glucosyl bounds thus forming a linear chain starch structure (termed amylose) or by α-1,4 and α-1,6 glucosyl-glucosyl bounds thus forming a branched chain starch structure (termed amylopectin) having a α-1,6 glucosyl-glucosyl bound at the branching point.

Starch occurs in nature as a polydisperse mixture of polymeric molecules which have, depending on the plant source, mainly a linear structure or mainly a branched structure. Starch can also occur in nature as a polydisperse mixture of molecules with said structures. The degree of polymerisation (DP), i.e. the number of glucosyl units linked to one another in a starch molecule, may widely vary and it largely depends on the plant source and the harvesting time.

The linkages between the glucosyl units are sensitive to hydrolysis, heat and shearing forces. This phenomenon is industrially exploited to prepare through acidic hydrolysis, enzymatic hydrolysis, thermal treatment or shearing, or through combinations of said treatments, various starch derivatives, generically termed herein starch hydrolysates. Depending on the source of the starch, the hydrolysis catalyst, the hydrolysis conditions, the thermal treatment and/or the shearing conditions, a wide variety of starch hydrolysates can be obtained, ranging from a product essentially composed of glucose, over products commonly termed glucose syrups, to products commonly termed maltodextrins and dextrins. Starch hydrolysates are well known in the art.

D-glucose (dextrose) presents strong reducing power. Starch hydrolysates are polydisperse mixtures, composed of D-glucose, oligomeric (DP 2≦10) and/or polymeric (DP>10) molecules composed of D-glucosyl chains, which also present reducing power resulting from the presence of D-glucose and reducing sugar units (which are essentially terminal glucosyl units) on the oligomeric and polymeric molecules.

A result thereof is that, starting from a given starch product, the more the hydrolysis has proceeded, the more molecules (monomeric D-glucose, oligomeric and remaining polymeric molecules) will be present in the hydrolysate, and thus the higher the reducing powder of the obtained starch hydrolysate. Accordingly, the reducing power of starch hydrolysates has become the distinguishing feature of choice to differentiate and designate the various starch hydrolysate products. The reducing power is expressed as dextrose equivalents (D.E.) which formally corresponds to the grams of D-glucose (dextrose) per 100 grams of dry substance. D-glucose having per definition a D.E. of 100, the D.E. indicates the amount of D-glucose and reducing sugar units (expressed as dextrose) in a given product on a dry product basis. Thus the D.E. is in fact also a measurement of the extent of the hydrolysis of the starch and also a relative indication of the average molecular weight of the glucose polymers in the starch hydrolysate.

The D.E. of starch hydrolysates, apart from hydrolysates composed essentially of D-glucose, may range from 1 to about 96 and starch hydrolysates are commercially available in a wide variety of grades based on the D.E.

Hydrolysates with a D.E. greater than 20 are commonly termed glucose syrups. Glucose syrups with a D.E. up to 47 can be dried by conventional techniques, for example by spray drying, to yield so-called "dried glucose syrups" in powder form, containing maximum about 5 wt % humidity.

Hydrolysates with a D.E. of 20 or less are commonly termed maltodextrins and dextrins. The manufacturing process usually involves at the end a spray drying step, yielding these hydrolysate products in powder form also containing maximum about 5 wt % humidity (wt % indicates % by weight).

Glucose syrups, maltodextrins and dextrins are industrially made at large scale from various starch sources under controlled hydrolysis conditions according to well-known methods. The various grades of starch hydrolysates obtained are usually defined by their starch source material and by their D.E. value, often in combination with an indication of the method of manufacture (e.g. maltodextrins/dextrins).

It has to be noted that whereas starch is normally present in the form of spherical particles, maltodextrins and glucose syrups are not. Indeed, in preparation of the hydrolysis reaction leading to said products, the starch particles have been submitted to a treatment which has brought them into solution or in the form of a swollen gel. As a result thereof and in combination with the subsequent hydrolysis of the starch molecules, said spherical particle form has been definitively broken up.

Although following certain Regulations the term maltodextrins is reserved to products derived from corn starch, the term maltodextrin(s) used herein in not limited to the hydrolysate of corn starch but indicates herein starch hydrolysates with a D.E. of 20 or less obtained from starch from any source.

Typically commercial sources of starch are corn, potato, tapioca, rice, sorgum and wheat. However the starch hydrolysates which are suitable according to the present invention are not limited to starch from said sources, but they extend to starch from any source.

Glucose syrups, maltodextrins and dextrins are well known and commercially available. For example, the production, properties and applications of glucose syrups and maltodextrins have been described in review articles in the book Starch Hydrolysis Products, Worldwide Technology, Production and Applictions, Weinheim VCH Publishers Inc. (1992). Furthermore, in the technical brochure "GLUCIDEX® Brochure 8/09.98" from Roquette company, maltodextrins and dried glucose syrups are described and various grades are offered for sale.

In one aspect, the present invention relates to a method of use as a tensio-active agent of a glucoside alkyl urethane (I), also named glucoside N-alkyl carbamate (I), which is composed of units of general formula (II)

$$A(O\text{---}CO\text{---}NH\text{---}R)_s \quad\quad (II)$$

wherein

A represents a glucosyl unit of a starch hydrolysate molecule, the starch hydrolysate having a Dextrose Equivalent (D.E.) ranging from 1 to 47, (O—CO—NH—R) represents an N-alkyl aminocarbonyloxy group, also called an alkyl carbamate group, replacing a hydroxyl group of the glucosyl unit A, and wherein R represents a linear or branched, saturated or unsaturated alkyl group containing from 3 to 22 carbon atoms, and s represents the number of alkyl carbamate groups per glucosyl unit which number is commonly expressed as degree of substitution (DS), i.e. the average number of substituents per glucosyl unit of the glucoside alkyl urethane (I), with said DS value ranging from about 0.01 to about 2.0.

The number of hydroxyl groups per glucosyl unit of the subject glucoside molecules which theoretically can be substituted by a carbamate group is for a non-terminal, non-branched glucosyl unit maximal 3, whereas said number for a terminal and for a non-terminal branched glucosyl unit is, respectively, 4 and 2. Furthermore, since the DS represents an average number of substituents per glucosyl unit, it is obvious that in a glucoside N-alkyl carbamate (I) molecule there may be glucosyl units present which are not substituted by an alkyl carbamate group (thus s in formula (II) being zero for said glucosyl unit).

In an other aspect, the present invention relates to novel glucoside alkyl urethanes (I) composed of units of general formula (II) defined above.

In a further aspect, the present invention relates to a process for the manufacture of the glucoside alkyl urethanes (I) composed of units of general formula (II) defined above.

In still a further aspect, the present invention relates to a composition comprising as tensio-active agent one or more glucoside alkyl urethanes (I) composed of units of general formula (II) defined above, and to a method for the manufacture of said composition.

Hereinafter the term glucoside alkyl urethane(s) (I) composed of units of general formula (II) according to the present invention is abbreviated to glucoside alkyl urethane(s) (I), urethane(s) (I), glucoside N-alkyl carbamate(s) (I), and carbamate(s) (I), terms which are used interchangeably.

Starch hydrolysates commonly appear in the form of a polydisperse mixture of glucoside molecules. Accordingly, when such a mixture is used, as is usually the case, as starting material for the preparation of a glucoside alkyl urethane (I), the product obtained is also a corresponding polydisperse mixture of glucoside alkyl urethanes (I). Such polydisperse mixtures of glucoside alkyl urethanes (I) are very suitable for use as tensio-active agents in accordance with the present invention and in fact constitute a preferred embodiment thereof.

Commercial grades of starch hydrolysates, composed of said polydisperse mixture of glucoside molecules and having a D.E. ranging from 1 to 47 are very suitable for the preparation of glucoside alkyl urethanes (I). On the other hand, mixtures of one or more commercial grades of starch hydrolysates can also be used as source material in the manufacture of glucoside alkyl urethanes (I). This flexibility in choice of source material for the preparation of urethanes (I) constitutes a significant technical advantage. Indeed the physical and tensio-active properties of the glucoside alkyl urethanes (I) of the invention partly depend on the D.E. of the starch hydrolysate used for their preparation. Accordingly, the possibility of using starch hydrolysates or mixtures of starch hydrolysates with selected D.E. values enables to control to a certain extent the physical and tensio-active properties of the glucoside alkyl urethanes (I).

Typically suitable starch hydrolysates for use in the preparation of glucoside N-alkyl urethanes (I) of the invention are for example GLUCIDEX® maltodextrins and GLUCIDEX® dried glucose syrups which are available from ROQUETTE company, such as the maltodextrins of type 1 (potato based with D.E. max 5), type 2 (Waxy Maize based with D.E. max 5), type 6 (Waxy Maize based with D.E. 5 to 8), type 9 (Potato based with D.E. 8 to 10), and maltodextrins of type 12 (D.E. 11 to 14), type 17 (D.E. 15 to 18) and type 19 (D.E. 18 to 20), as well as dried glucose syrups of type 21 (D.E. 20 to 23), type 28E (D.E. 28 to 31), type 29 (D.E. 28 to 31), type 32 (D.E. 31 to 34), type 33 (D.E. 31 to 34), type 38 (D.E. 36 to 40), type 39 (D.E. 38 to 41), type 40 (D.E. 38 to 42) and type 47 (D.E. 43 to 47).

Depending on the preparation method and the purification/working up procedure used, starch hydrolysates commonly contain a certain content of D-glucose. For example, the D-glucose content of GLUCIDEX® maltodextrins typically ranges from about 0.5% to about 2% (% is % on total hydrocarbons), and of GLUCIDEX® dried glucose syrups the D-glucose content typically ranges from about 3% to about 17%.

Accordingly, when starch hydrolysate products containing a certain amount of glucose are transformed into glucoside alkyl urethanes (I), said glucose may simultaneously be transformed into the corresponding glucose N-alkyl urethane. Depending on the preparation method, in particular on the isolation and purification of the urethane (I), the concentration of glucose alkyl urethane in the urethane (I) may correspond to the concentration of D-glucose in the starch hydrolysate, but usually, said concentration will be reduced.

However the presence of glucose N-alkyl carbamate in the glucoside N-alkyl urethanes (I) according to the present invention has no adverse effect on the properties, particularly on the tensio-active properties of the glucoside alkyl urethanes (I) and of compositions containing said glucoside alkyl urethanes (I). However, the total concentration of glucose N-alkyl carbamate in the urethanes (I) on the total amount of alkyl urethanes (I) should be less than 20%, preferably less than 15%, more preferably less than 10%, even more preferably less than 5% and most preferably maximally 3%.

The alkyl group of the alkyl urethanes (I) of the present invention, i.e. the R group in formula (II) defined herein above, is preferably a saturated $C_3$-$C_{22}$ alkyl group, more preferably a saturated $C_4$-$C_{18}$ alkyl group, even more preferably a saturated linear $C_4$-$C_{18}$ alkyl group, most preferably a saturated linear $C_6$-$C_{18}$ alkyl group. Typically suitable alkyl groups include butyl, hexyl, octyl, decyl, dodecyl, tetradecyl, hexadecyl and octadecyl groups.

In another preferred embodiment, the alkyl group is a mono-unsaturated $C_3$-$C_{22}$ alkyl group, preferably a mono-unsaturated $C_4$-$C_{18}$ alkyl group, most preferably a mono-unsaturated linear $C_6$-$C_{18}$ alkyl group. Typically suitable mono-unsaturated alkyl groups include hexenyl, octenyl, decenyl, dodecenyl, tetradecenyl, hexadecenyl and octadecenyl groups.

In the urethane (I) of the invention, all R groups of the composing units of formula (II) may be the same, but the urethane (I) may also be composed of units of formula (II) bearing different R groups as defined herein before. The latter urethanes (I) can be easily prepared, according to the method described below, by reacting a starch hydrolysate with an isocyanate of formula R-NCO which is in fact a mixture of two or more isocyanates bearing different R groups defined above.

Saturated alkyl isocyanates can be prepared conventionally, e.g. by reacting a primary or secondary alkyl-amine with phosgene. Unsaturated alkylisocyanates can be prepared similarly from alkenyl-amines. Alpha-beta unsaturated alkylisocyanates of formula $R^2R^3C$=CH—NCO (III) wherein the radical $R^2R^3C$=CH— corresponds to the group R of formula (II) and wherein $R^2$ represents hydrogen or an alkyl group and $R^3$ represents an alkyl or vinyl group, can be prepared by condensation of the aldehyde $R^2R^3CH$—CHO with $Me_3C$—NH2, followed by reaction of the resultant Schiff base (in equilibrium with its enamine form) with phosgene, and thermal elimination of $Me_3C$—Cl as disclosed by K. Koenig et al. (Angew. Chem., 91(4), 334-335 (1979)). Furthermore, various unsaturated alkylisocyanates are disclosed, inter alia in U.S. Pat. No. 3,890,383 and U.S. Pat. No. 3,803,062 of Dow Chemical Co. Many alkyl cyanates of formula R—N=C=O (R as defined above) are commercially available.

The glucoside alkyl urethanes (I) in accordance with the present invention have a degree of substitution (DS) ranging from 0.01 to 2.0, preferably from 0.03 to 1.0, more preferably from 0.04 to 0.5.

The positions on the glucosyl units of the glucoside alkyl urethanes (I) where the said alkyl carbamate substituent or substituents are located, are not critical with respect to the present invention.

The glucoside alkyl urethanes (I) of the present invention can be prepared in analogy with conventional methods for the preparation of urethanes of monosaccharides, disaccharides, and polysaccharides, for example, by reacting the starch hydrolysate with the selected alkyl isocyanate or mixture of alkyl isocyanates, in solution in a solvent which is inert with respect to the starch hydrolysate, the isocyanate and the reaction product. Suitable solvents include solvents or solvent mixtures which are free of reactive hydroxyl and amine groups, such as for example dimethyl formamide (DMF), dimethyl sulfoxide (DMSO) and N-methyl pyrrolidone (NMP).

The reaction between the starch hydrolysate and the alkylisocyanate has to be carried out, most preferably under anhydrous conditions. In view thereof, the starch hydrolysate as well as the solvent(s) are dried, preferably to a water content of less than 0.5 wt %, prior to bring them into contact with the alkyl isocyanate. The drying can be carried out by conventional techniques, including, for example by heating the starch hydrolysate in a stream of dry air, or by heating the starch hydrolysate under reduced pressure, or by removing the water through azeotropic distillation, optionally under reduced pressure, from a solution of the starch hydrolysate in the solvent chosen for the reaction. During the drying a maximum temperature, depending on the nature of the starch hydrolysate and the solvent should not be exceeded in order to avoid any decomposition or side reaction. Preferably said temperature should be kept below about 80° C.

The reaction is typically carried out by bringing the starch hydrolysate dissolved in a suitable solvent into contact, under gently to vigorous stirring, with the alkyl isocyanate in neat form or also dissolved in an anhydrous solvent. The reaction can be carried out over a wide temperature range, typically from room temperature till about 80° C. or the reflux temperature of the reaction mixture if it is lower, preferably at a temperature between about 60° C. and about 80° C.

Typically, the starch hydrolysate is dissolved in a suitable solvent, where necessary under heating. Accordingly the alkyl isocyanate (optionally dissolved in the same or in another inert solvent but which is preferably miscible with the former solvent) is slowly added under stirring to the dissolved glucoside. The desired degree of substitution of the glucoside alkyl urethane (I) can be obtained by controlling the ratio of the reactants. Since the reaction of an alkyl isocyanate with an alcoholic hydroxyl group to form an urethane is about a quantitative reaction, the degree of substitution of the urethane (I) can be controlled by the selection of the proper mole ratio of the alkyl isocyanate per glucosyl unit of the starch hydrolysate. Usually the reaction mixture is heated with stirring during a certain time, usually from about 30 minutes to about 24 hours, in order to complete the reaction between the reagents. The reaction mixture is then worked up by conventional techniques, for example, by precipitating the formed urethane (I) through pouring the reaction mixture, usually after cooling to room temperature, in a precipitant solvent, which is a solvent that is miscible with the solvent or solvents used to dissolve the reagents but in which the glucoside alkyl urethane (I) is not or very poorly soluble. The urethane (I) is then physically isolated from the reaction mixture, for example by filtration or centrifugation, washed with a suitable solvent in which the urethane (I) is not or only very slightly soluble, and dried via common techniques.

A further convenient method to synthesize a desired urethane (I) according to the present invention, occurs in an analogue manner to the one described by W. Gerhardt, Abh. Dtsch. Akad. Wiss. Berlin, KL. Chem. Geol. Biol., Vol. 1966 (6), 24-32, (1967) (C.A., 68 14323). It involves the transformation in a one-pot reaction in dimethyl formamide of the starch hydrolysate with potassium cyanate and with a selected alkyl halogenide, preferably an alkyl bromide.

The inventors have developed a suitable method for the manufacture of glucoside alkyl urethanes (I), from grades of starch hydrolysates which may contain D-glucose to an extent of about 20% by weight while nevertheless ending up with an urethane (I) which contains a significantly smaller amount of the corresponding D-glucose N-alkyl carbamate. According to this process, the starch hydrolysate is reacted in an inert solvent or solvent mixture (termed herein first solvent) with the selected alkyl isocyanate or alkyl isocyanate mixture which is optionally dissolved in the same or in another inert first solvent. After the reaction is completed, the reaction mixture is cooled to room temperature and treated, preferably after prior concentration by evaporation of a part of the first solvent under reduced pressure, with a solvent or solvent mixture (termed herein precipitant solvent) wherein the first solvent and a considerable amount of D-glucose alkyl carbamate remain in solution, but in which the glucoside alkyl urethanes (I) are not or only very slightly soluble. Accordingly, the formed glucoside alkyl urethanes (I) precipitate in the precipitant solvent from which they can be easily isolated by a conventional physical separation technique such as decantation and/or filtration, or centrifugation. To complete the removal of remaining first solvent and to further reduce the amount of possible remaining D-glucose alkyl carbamate, the isolated reaction product can be triturated and/or washed with the precipitant solvent or with another suitable precipitant solvent, or other techniques can be used such as e.g. redissolving and reprecipitation of the obtained urethane (I), followed by its isolation and drying.

Suitable first solvents include, for example, dimethyl formamide, dimethyl sulfoxide and N-methyl pyrrolidone; suitable precipitant solvents include, for example, ethers such as diethyl ether, dichloromethane, ketones such as acetone, alcohols and esters.

The glucoside alkyl urethanes (I) are readily soluble at low concentration in water at room temperature. In general, the solubility in water or an aqueous medium of the glucoside alkyl urethanes (I) will decrease with an increase of the DS and with an increase of the number of carbon atoms in the R group in formula (II).

The glucoside alkyl urethanes (I) present good to excellent tensio-active properties, even at very low concentration. Accordingly, they are very useful as surface-active agents because they significantly reduce interfacial tension between an aqueous liquid and a non-aqueous liquid, between an aqueous liquid and a solid, and between an aqueous liquid and a gas.

Preferably the glucoside alkyl urethanes (I) are used as surface-active agent in an aqueous medium, more preferably in water, at a concentration ranging from about 0.001% to about 5%, preferably from about 0.005% to about 3%, more preferably from about 0.01% to about 2%, even more preferably from about 0.01% to about 1% (concentration in % weight/volume {% w/v}).

As a non-limiting illustration of the present invention, the preparation and tensio-active properties of some glucoside alkyl urethanes (I) are shown in the Examples and Tables below.

General procedure used for the manufacture of glucoside alkyl urethanes (I). The reaction is carried out in the absence of humidity with anhydrous reagents and solvents. The glucoside, conventionally dried, e.g. under vacuum over P2O5 or by azeotropically distilling off of the water by means of a suitable solvent, is dissolved, with stirring under heating to maximally 80° C., in a minimum amount of solvent, e.g. dimethyl formamide (DMF) or N-methyl pyrrolidone (NMP). Preferably the mixture is kept between about 60° C. to about 80° C. until all glucoside has dissolved. Then, at a temperature between about 60° C. to about 80° C., a predefined amount (determined in mole equivalents on glucosyl units in the glucoside; for the calculation, the amount of glucoside starting material is taken as composed of 100% glucosyl units) of a selected alkyl isocyanate, optionally diluted with a suitable solvent, e.g. DMF, is added slowly, preferably dropwise, under vigorous stirring to the glucoside solution and the obtained mixture is stirred at said temperature for about 24 hours in total after addition of the alkyl isocyanate to complete the reaction. Accordingly, the mixture is cooled to room temperature, optionally part of the solvent is removed by evaporation under reduced pressure, and the mixture is dropwise added under vigorous stirring to an excess of precipitant solvent. The formed glucoside alkyl urethane (I) precipitates usually as a white powder or as white lumps. After removal of the supernatant solvent mixture, e.g. by decantation and or filtration, the isolated precipitate, i.e. the glucoside alkyl urethane (I) formed, can be further purified by washing or trituration with a non-solvent, e.g. ether, acetone or methylene chloride, or they may be redissolved and reprecipitated to remove possibly included solvent and impurities, yielding the glucoside alkyl urethane (I) in powder or granulate form, which is then isolated and dried. The yields of glycoside alkyl carbamates (I) obtained are good and the formation of the urethanes (I) has been confirmed by IR-spectroscopy and by $^{13}$C-NMR spectroscopy.

The above general procedure is further illustrated by the following examples. The tensio-active properties of the glucoside alkyl urethanes (I) were determined by measuring the surface tension at 20° C. of an aqueous solution of the compounds with a tensiometer following the Du Nouy ring method.

EXAMPLE 1

GLUCIDEX® D.E. 2 N-n-octyl carbamate 10 g GLUCIDEX® D.E. 2 were dissolved under stirring at about 70° C. in 18 ml of dry DMF. To the solution 0.547 ml n-octyl isocyanate were added dropwise with stirring at 70° C. and stirring was continued at 70° C. for 24 hours. After cooling to room temperature, the solution was added under stirring to 100 ml dry diethyl ether and the mixture was stirred for 1 hour. The white precipitate obtained was isolated by filtration, washed with dichloromethane and dried (by removing residual solvent under reduced pressure), yielding GLUCIDEX® D.E. 2 N-n-octyl-carbamate with a degree of substitution of 0.035-0.05 (determined by $^1$H NMR-270 MHz).

EXAMPLE 2

GLUCIDEX® D.E. 2 N-n-octyl carbamate 10 g GLUCIDEX® D.E. 2 were dissolved under stirring at about 70° C. in 18 ml of dry N-methyl-pyrrolidone (NMP). To the solution 0.547 ml n-octyl isocyanate were added dropwise with stirring at 70° C. and stirring was continued at 70° C. for 24 hours. After cooling to room temperature, the solution was added under stirring to 100 ml dry acetone and the mixture was stirred for 1 hour. The white precipitate obtained was isolated by filtration, washed with dichloromethane, and dried (the residual solvent was removed under reduced pressure), yielding GLUCIDEX® D.E. 2 N-n-octyl-carbamate with a degree of substitution of 0.035-0.05 (determined by $^1$H NMR-270 MHz).

EXAMPLE 3

GLUCIDEX® D.E. 2 N-n-octyl carbamate 10 g GLUCIDEX® D.E. 2 were dissolved under stirring at about 70° C. in 18 ml of dry NMP. To the solution 0.547 ml n-octyl isocyanate were added dropwise with stirring at 70° C. and stirring was continued at 70° C. for 24 hours. The reaction mixture was cooled to about 45° C. and pulverised through a nozzle at about 3 ml/min into a stream of $CO_2$ at 200 bar. The flow rate of the $CO_2$ was about 15 kg/hr. The $CO_2$ being not a solvent for the carbamate (I), the carbamate (I) crystallises in the $CO_2$ stream while the NMP dissolves in the $CO_2$. At the bottom of the reactor, the formed GLUCIDEX® D.E. 2 N-n-octyl carbamate accumulates as a fine, white powder, while the $CO_2$ stream liberates after expansion, the NMP in one or more cyclones. The obtained GLUCIDEX® D.E. 2 N-n-octyl carbamate had a degree of substitution of 0.035-0.05 (determined by $^1$H NMR-270 MHz).

EXAMPLE 4

GLUCIDEX® D.E. 28 N-n-dodecyl carbamate 10 g GLUCIDEX® D.E. 28 were dissolved under stirring at about 70° C. in 14 ml of dry DMF. To the solution 1.49 ml n-dodecyl isocyanate were added dropwise with stirring at 70° C. and stirring was continued at 70° C. for 24 hours. After cooling to room temperature, the solution was added under stirring to 100 ml dry diethyl ether and the mixture was stirred for 1 hour. The white precipitate formed was isolated by filtration, washed with dichloromethane and dried (residual solvent was removed under reduced pressure), yielding GLUCIDEX® D.E. 28 N-n-dodecyl-carbamate with a degree of substitution of 0.075-0.1 (determined by $^1$H NMR-270 MHz).

EXAMPLE 5

GLUCIDEX® D.E. 47 N-n-dodecyl carbamate 10 g GLUCIDEX® D.E. 47 were dissolved under stirring at about 70° C. in 14 ml of dry DMF. To the solution 1.49 ml n-dodecyl isocyanate were dropwise added with stirring at 70° C. and stirring was continued at 70° C. for 24 hours. After cooling to room temperature, the solution was added under stirring to 100 ml dry diethyl ether and the mixture was stirred for 1 hour. The white precipitate formed was isolated by filtration, treated with dichloromethane and dried (residual solvent was removed under reduced pressure), yielding GLU-CIDEX® D.E. 47 N-n-dodecyl carbamate with a degree of substitution of 0.085-0.1 (determined by $^1$H NMR-270 MHz).

Following the procedure of examples 1, 2, 4 or 5, several glucoside N-alkyl carbamates (I) have been prepared which are listed in Table 1 below.

TABLE 1

GLUCIDEX ® alkyl carbamates (I)

| Product Lab code | Product number | GLUCIDEX ® type (D.E.) | alkyl group* | degree substit. DS (theor)** | degree substit. DS (NMR)** |
|---|---|---|---|---|---|
| AM 63 | 1 | GLUCIDEX ® 2 | 8 | 0.1 | |
| AM 111 | 2 | GLUCIDEX ® 2 | 8 | 0.2 | |
| AM 64 | 3 | GLUCIDEX ® 2 | 8 | 0.05 | |
| AM 110 | 4 | GLUCIDEX ® 2 | 8 | 0.15 | |
| AM 114 | 5 | GLUCIDEX ® 28 | 8 | 0.2 | |
| AM 65 | 6 | GLUCIDEX ® 28 | 8 | 0.05 | 0.06 |
| AM 66 | 7 | GLUCIDEX ® 28 | 8 | 0.1 | 0.12 |
| AM 113 | 8 | GLUCIDEX ® 28 | 8 | 0.15 | |
| AM 42 | 9 | GLUCIDEX ® 28 | 8 | 0.2 | |
| AM 43 | 10 | GLUCIDEX ® 28 | 8 | 0.4 | 0.42-0.48 |
| AM 112 | 11 | GLUCIDEX ® 47 | 8 | 0.2 | |
| AM 67 | 12 | GLUCIDEX ® 47 | 8 | 0.05 | 0.07 |
| AM 68 | 13 | GLUCIDEX ® 47 | 8 | 0.1 | 0.11 |
| AM 46 | 14 | GLUCIDEX ® 47 | 8 | 0.2 | |
| AM 47 | 15 | GLUCIDEX ® 47 | 8 | 0.4 | 0.42 |
| AM 115 | 16 | GLUCIDEX ® 2 | 12 | 0.1 | |
| AM 142 | 17 | GLUCIDEX ® 2 | 12 | 0.2 | |
| AM 141 | 18 | GLUCIDEX ® 2 | 12 | 0.05 | |
| AM 116 | 19 | GLUCIDEX ® 28 | 12 | 0.1 | |
| AM 144 | 20 | GLUCIDEX ® 28 | 12 | 0.2 | 0.21 |
| AM 143 | 21 | GLUCIDEX ® 28 | 12 | 0.05 | 0.058 |
| AM 117 | 22 | GLUCIDEX ® 47 | 12 | 0.1 | |
| AM 146b | 23 | GLUCIDEX ® 47 | 12 | 0.2 | |
| AM 145 | 24 | GLUCIDEX ® 47 | 12 | 0.05 | 0.042 |
| AM 146a | 25 | GLUCIDEX ® 47 | 12 | 0.2 | 0.197 |
| AM 139 | 26 | GLUCIDEX ® 2 | 18 | 0.1 | |
| AM 138 | 27 | GLUCIDEX ® 2 | 18 | 0.05 | |
| AM 137 | 28 | GLUCIDEX ® 28 | 18 | 0.1 | |
| AM 136 | 29 | GLUCIDEX ® 28 | 18 | 0.05 | 0.047 |
| AM 134 | 30 | GLUCIDEX ® 47 | 18 | 0.05 | 0.051 |
| AM 135 | 31 | GLUCIDEX ® 47 | 18 | 0.1 | 0.086 |

*linear, saturated alkyl group (number of C atoms given) of the alkyl isocyanate used. The isocyanates were commercially available technical grade products.
**For several carbamates (I) the degree of substitution has been given as determined by $^1$H NMR - 270 MHz. For all carbamates (I), the theoretical degree of substitution has been given based on the molar ratio alkyl isocyanate/glucosyl units of the starting mixture. It has been experimentally determined that for the carbamates (I) the experimental degree of substitution determined by $^1$H NMR - 270 MHz corresponds fairly well with the theoretical degree of substitution based on the molar ratio alkyl isocyanate/glucosyl units of the starting mixture.

Surface Tension and Interface Tension of Carbamates (I)

The surface tension as well as the interfacial tension have been determined for carbamates (I) according to the "Du Nouy ring method" by means of a Krüss tensiometer. The results are given in Table 2 below. The product number corresponds to the product number given in Table 1 above.

TABLE 2

Surface tension and interfacial tension

Surfactant: carbamate (I)

| Product No | Conc. in % w/v in surfactant (water) solution | Surface Tension° at 20° C. (mN/m) | Interfacial Tension°° at 20° C. (mN/m) paraffinic oil* |
|---|---|---|---|
| 19 | 0.01 | 36.5 | 5.7 |
| 22 | 0.01 | 37.4 | 6.3 |
| 1 | 0.01 | 28.2 | 1.7 |
| 7 | 0.01 | 40 | 11 |

°Surface tension of water: 72-74 mN/m
°°Interfacial tension of water/paraffinic oil: 44 mN/m
*Isoparaffinic hydrocarbon "Isopar M" (Exxon)

The experimental data shown in Table 2 clearly indicate that the urethanes (I) present useful to excellent tensio-active properties at low concentration e.g. a concentration of 0.01% w/v in water, and from said data it can be concluded that the urethanes (I) have great potential as surfactants.

Emulsifying Properties of Carbamates (I)

The carbamates (I) present very good emulsifying properties, in particular with respect to oil/water systems. Typical oils include, for example, vegetable oils, hydrocarbon oils and mineral oils, and any mixture thereof. The emulsions may find wide applications, depending of the nature of the oil, in various fields, such as, for example, in household products, in person care applications, in agro-chemicals, in pesticides and in industrially used emulsions.

The oil content in the emulsions can, for example, range from about 5 wt % to about 75 wt %. The total concentration of the surfactant, carbamate (I) or a mixture of two or more carbamates (I), in the surfactant solution used to build the water phase can, for example, range from about 0.3 wt % to about 3 wt %, typically from about 0.5 wt % to about 2 wt %.

The emulsifying properties of the urethanes (I) are illustrated by the example below in which various oil/water emulsions, containing a carbamates (I) as surfactant, were prepared and evaluated according to standard procedures.

Preparation of the Emulsions.

To 25 ml surfactant solution, composed of a given concentration (wt %) of a carbamates (I) in demineralised water, were added dropwise 25 ml oil, while the mixture was stirred by means of an Ultra-Turrax* (CAT X620) (*trade name). The oil was added during the first step of a four step mixing process, in which the mixing speed was stepwise increased as indicated in Table 3 below, yielding the emulsion. However, the mixing procedure is not critical since other procedures than the one given yield about the same results.

TABLE 3

Mixing procedure

| | Step | | | |
|---|---|---|---|---|
| | 1 | 2 | 3 | 4 |
| Stirring speed (rpm) | 9,500 | 13,500 | 20,500 | 24,000 |
| Stirring time (sec) | 120 | 60 | 45 | 60 |

Evaluation of the Emulsions.

The evolution in time of the emulsions kept at room temperature was followed both microscopically (evolution of the droplet size) and macroscopically (visual check for oil separation). The results are shown in Table 4 below.

TABLE 4

Evaluation of oil/water emulsions containing carbamates (I)

| Total wt % of carbamate (I) in the surfactant solution (= water phase) | Alkyl carbamate (I) Product No* | Oil | Stability of the emulsion (days) (2) |
|---|---|---|---|
| 1 | 3 | isoparaffinic oil (1) | >70 |
| 2 | 3 | isoparaffinic oil (1) | >70 |
| 1 | 1 | isoparaffinic oil (1) | >70 |
| 2 | 1 | isoparaffinic oil (1) | >70 |
| 2 | 18 | isoparaffinic oil (1) | >14 |
| 4 | 18 | isoparaffinic oil (1) | >14 |
| 2 | 17 | isoparaffinic oil (1) | >14 |
| 4 | 17 | isoparaffinic oil (1) | >14 |
| 2 | 20 | isoparaffinic oil (1) | >14 |
| 4 | 20 | isoparaffinic oil (1) | >14 |
| 4 | 25 | isoparaffinic oil (1) | >14 |
| 2 | 27 | isoparaffinic oil (1) | >14 |
| 4 | 27 | isoparaffinic oil (1) | >14 |
| 4 | 29 | isoparaffinic oil (1) | >14 |
| 4 | 30 | isoparaffinic oil (1) | >14 |
| 2 | 26 | isoparaffinic oil (1) | >14 |
| 4 | 26 | isoparaffinic oil (1) | >14 |
| 2 | 31 | isoparaffinic oil (1) | >14 |
| 4 | 31 | isoparaffinic oil (1) | >14 |

*The product number corresponds to the product number given in Table 1.
(1): isoparaffinic hydrocarbon "Isopar M" (trade name of Exxon)
(2): the emulsion was stable (no oil separation observed) at room temperature and at 50° C. for at least the indicated time.

Use of Glucoside Alkyl Carbamates (I) as Dispersants

Dispersions were made from surfactant solutions containing one or more carbamates (I) described above by adding a pre-determined amount of a product in powder form to said surfactant solution under stirring by means of an Ultra-Turrax* (CAT X 620) (* trade name). The powder was added during the first step of a four step mixing process in which the mixing speed was increased stepwise. However, the mixing procedure is not critical since also other procedures yield about the same results. The dispersions obtained were inspected visually and microscopically (100×) in function of the time.

A dispersion was made (mixing procedure 90 sec. at 9,500 rpm; 60 sec. at 13,500 rpm; 30 sec. at 20,500 rpm and 15 sec. at 24,000 rpm) of 0.5 g carbon black (Efltex 575 variant, Cabot Corporation) in 25 ml surfactant solution of 3% w/v of respectively carbamate No. 1, 3 and 19. For all three carbamates (I) dispersions with a very good stability were obtained in which the particle size of the dispersed product was smaller than in a corresponding dispersion similarly made from water (without any surfactant) and the powder product.

Similarly a dispersion was made (mixing procedure 240 sec. at 8,000 rpm) of 7.5 g $Al_2O_3$ of ALCOA in) in 25 ml surfactant solution of 3% w/v of respectively carbamate No. 3, 16 and 19. For all three carbamates (I) dispersions with a very good stability were obtained in which the particle size of the dispersed product was smaller than in a corresponding dispersion similarly made from water (without any surfactant) and the powder product.

The above indicates that alkylcarbamates (I) have great potential as dispersants, for hydrophobic and hydrophylic products, since they enable to prepare dispersions with good stability.

The above indicated properties of the glucoside alkyl carbamates (I) are highly valuable for use as surface-active agents in various compositions and in premixes for the preparation of said compositions. These compositions and pre-mixes can be prepared according to conventional techniques, for example, by simple mixing, preferably under low speed stirring, of all ingredients of the composition in the required amounts, including the selected one or more glucoside glucoside alkyl urethanes (I), or by addition of a desired amount of the one or more selected glucoside alkyl urethanes (I) to a pre-mix of all other ingredients, or by adding a pre-mix containing all required ingredients, including the selected one or more glucoside alkyl urethanes (I), to a medium such as water, an aqueous or a non-aqueous liquid, for example an oil, or a pasty composition.

The surface-active agents of the present invention are suitable for use as detergents, emulsifiers, emulsion stabilisers, liposome stabilisers, foaming agents, foam stabilisers and/or wetting agents in various household and industrial applications, such as for example in detergents for laundry washing, detergents for dish washing, industrial detergents, emulsifiers in cosmetics, emulsifiers and stabilisers in inks, in paintings and in coating compositions, and foaming agents and/or foam stabilisers in shampoo's.

Furthermore, the glucoside alkyl urethanes (I) present good thermal and chemical stability in combination with good biodegradability and they are free of phosphor/phosphates. Furthermore, the main raw material for the manufacture of the carbamates (I), i.e. the starch hydrolysates, are common agro-chemicals, i.e. carbohydrates from vegetal origin which in fact constitute renewable resources.

The combination of said features and taking into account the good biodegradability of the glucoside alkyl carbamates (I) makes that the carbamates (I) are environmentally well acceptable. Besides, starch hydrolysates are available at industrial scale in suitable quality and at acceptable raw material prices which is an economically very important feature, making the use of the urethanes (I) as surfactants at industrial scale possible and attractive.

The invention claimed is:

1. A surface-active agent comprising a glucoside alkyl urethane (I), which is composed of units of formula (II)

A(O—CO—NH—R)$_s$     (II)

wherein
- A represents a glucosyl unit of a starch hydrolysate molecule, the starch hydrolysate having a Dextrose Equivalent (D.E.) ranging from 1 to 47,
- (O—CO—NH—R) represents an N-alkyl aminocarbonyloxy group replacing a hydroxyl group of the glucosyl unit A, and wherein R represents a linear or branched, saturated or unsaturated alkyl group containing from 3 to 22 carbon atoms, and
- s represents the number of alkyl carbamate groups per glucosyl unit which number is expressed as degree of substitution (DS) with said DS value ranging from about 0.01 to about 0.2 in solution.

2. The agent according to claim 1, wherein the alkyl group R is a saturated $C_3$-$C_{22}$ alkyl group or a mono-unsaturated $C_3$-$C_{22}$ alkyl group.

3. The agent according to claim 1, wherein the alkyl group R is a linear saturated or mono-unsaturated $C_6$-$C_{18}$ alkyl group.

4. The agent according to claim 1, wherein the urethane (I) is composed of units of formula (II) with two or more different alkyl groups R.

5. The agent according to claim 1, wherein the glucoside is a maltodextrin moiety.

6. The agent according to claim 1, wherein the glucoside is a dried glucose syrup moiety.

7. A glucoside alkyl urethane (I) which is composed of units of formula (II)

$$A(O\text{—}CO\text{—}NH\text{—}R)_s \quad (II)$$

wherein
- A represents a glucosyl unit of a starch hydrolysate molecule, the starch hydrolysate having a Dextrose Equivalent (D.E.) ranging from 1 to 47,
- (O—CO—NH—R) represents an N-alkyl aminocarbonyloxy group replacing a hydroxyl group of the glucosyl unit A, and wherein R represents a linear or branched, saturated or unsaturated alkyl group containing from 3 to 22 carbon atoms, and
- s represents the number of alkyl carbamate groups per glucosyl unit which number is expressed as a degree of substitution (DS) with said DS value ranging from about 0.01 to about 0.2.

8. A composition comprising as surface-active agent one or more glucoside alkyl urethanes (I) as defined in claim 7.

9. A composition according to claim 8, wherein the one or more glucoside alkyl urethanes (I) are present in a total concentration of 0.001% to 5% (% w/v).

10. A composition according to claim 8, which is a pre-mix composition suitable for the manufacture, by dilution with water, an aqueous medium or a non-aqueous medium, of a composition as defined in claim 9.

11. A process for the manufacture of a glucoside alkyl urethane (I) which is composed of units of formula (II)

$$A(O\text{—}CO\text{—}NH\text{—}R)_s \quad (II)$$

wherein
- A represents a glucosyl unit of a starch hydrolysate molecule, the starch hydrolysate having a Dextrose Equivalent (D.E.) ranging from 1 to 47,
- (O—CO—NH—R) represents an N-alkyl aminocarbonyloxy group replacing a hydroxyl group of the glucosyl unit A, and wherein R represents a linear or branched, saturated or unsaturated alkyl group containing from 3 to 22 carbon atoms, and
- s represents the number of alkyl carbamate groups per glucosyl unit which number is expressed as a degree of substitution (DS) with said DS value ranging from about 0.01 to about 0.2, which comprises
- reacting, under anhydrous conditions, a starch hydrolysate with a D.E. between 1 and 47, dissolved in a first solvent, with such an amount of alkyl isocyanate that an urethane (I) is produced having a degree of substitution (DS) ranging from 0.01 to 0.2, the first solvent being inert with respect to the glucoside, the isocyanate and the urethane (I), followed (i) by precipitation of the formed urethane (I), optionally after partial removal of the first solvent by evaporation under reduced pressure, either by addition under stirring of a precipitant solvent to the reaction mixture or by slowly pouring under stirring the, optionally concentrated, reaction mixture into a precipitant solvent, followed by isolation of the precipitated urethane (I), treating or washing of the urethane (I) with a precipitant solvent, and drying of the urethane (I) to a water content of less than 0.5 wt. %, or (ii) by spraying the reaction mixture in a stream of $CO_2$ under about 200 bar, with subsequent isolation, optionally washing with a precipitant solvent, and drying of the obtained urethane (I) wherein the temperature is maintained below 80° C. throughout the entire process.

12. A composition comprising the glucoside alkyl urethane (I) as defined in claim 1, wherein said glucoside alkyl urethane (I) is used in said composition as a detergent, emulsifier, emulsion, stabiliser, foaming agent, foam stabiliser, liposome stabiliser, dispersant and/or wetting agent.

13. The composition according to claim 12, wherein the alkyl group R is a saturated $C_3$-$C_{22}$ alkyl group or a mono-unsaturated $C_3$-$C_{22}$ alkyl group.

14. The composition according to claim 12, wherein the alkyl group R is a linear saturated or mono-unsaturated $C_6$-$C_{18}$ alkyl group.

15. The composition according to claim 12, wherein the urethane (I) is composed of units of fonnula (II) with two or more different alkyl groups R.

16. The composition according to claim 12, wherein the glucoside is a maltodextrin moiety.

17. The composition according to claim 12, wherein the glucoside is a dried glucose syrup moiety.

18. The glucoside alkyl urethane (I) according to claim 7, wherein the alkyl group R is a saturated $C_3$-$C_{22}$ alkyl group or a mono-unsaturated $C_3$-$C_{22}$ alkyl group.

19. The glucoside alkyl urethane (I) according to claim 7, wherein the alkyl group R is a linear saturated or mono-unsaturated $C_6$-$C_{18}$ alkyl group.

20. The glucoside alkyl urethane (I) according to claim 7, composed of units of formula (II) with two or more different alkyl groups R.

21. The glucoside alkyl urethane (I) according to claim 7, wherein the glucoside is a maltodextrin moiety.

22. The glucoside alkyl urethane (I) according to claim 7, wherein the glucoside is dried glucose syrup moiety.

23. The composition according to claim 8, wherein the alkyl group R is a saturated $C_3$-$C_{22}$ alkyl group or a mono-unsaturated $C_3$-$C_{22}$ alkyl group.

24. The composition according to claim 8, wherein the alkyl group R is a linear saturated or mono-unsaturated $C_6$-$C_{18}$ alkyl group.

25. The composition according to claim 8, wherein the urethane (I) is composed of units of formula (II) with two or more different alkyl groups R.

26. The composition according to claim 8, wherein the glucoside is a maltodextrin moiety.

27. The composition according to claim 8, wherein the glucoside is dried glucose syrup moiety.

28. The process according to claim 12, wherein the alkyl isocyanate is added to the reaction, with stirring.

* * * * *